(12) United States Patent
Schwarzkopf et al.

(10) Patent No.: US 9,103,481 B2
(45) Date of Patent: Aug. 11, 2015

(54) HEATABLE MEDIUM PIPE AND METHOD FOR PRODUCING SAME

(75) Inventors: Otfried Schwarzkopf, Kürten (DE); Manfred Berg, Wipperfürth (DE); Josef Brandt, Wipperfürth (DE); Tobias Etscheid, Lindlar (DE); Mark Heienbrok, Engelskirchen (DE); Marco Isenburg, Ratingen (DE); Markus Jeschonnek, Wipperfürth (DE); Christoph Schöneberg, Wemelskirchen (DE); Horst Plum, Bergisch Gladbach (DE)

(73) Assignee: VOSS AUTOMOTIVE GMBH, Wipperfurth (DE)

( * ) Notice: Subject to any disclaimer, the term of this patent is extended or adjusted under 35 U.S.C. 154(b) by 117 days.

(21) Appl. No.: 13/811,744
(22) PCT Filed: Jun. 24, 2011
(86) PCT No.: PCT/EP2011/003136
§ 371 (c)(1),
(2), (4) Date: Mar. 15, 2013
(87) PCT Pub. No.: WO2012/010246
PCT Pub. Date: Jan. 26, 2012

(65) Prior Publication Data
US 2013/0163970 A1   Jun. 27, 2013

(30) Foreign Application Priority Data
Jul. 23, 2010   (DE) .......................... 10 2010 032 189

(51) Int. Cl.
*F24H 1/10* (2006.01)
*H05B 3/40* (2006.01)
(Continued)

(52) U.S. Cl.
CPC .............. *F16L 53/008* (2013.01); *F16L 25/01* (2013.01); *F24H 1/0018* (2013.01); *F01N 2610/02* (2013.01); *F01N 2610/10* (2013.01); *F01N 2610/14* (2013.01)

(58) Field of Classification Search
None
See application file for complete search history.

(56) References Cited

U.S. PATENT DOCUMENTS

| 5,704,113 | A | * | 1/1998 | Mak ................................ 29/611 |
| 5,933,574 | A | | 8/1999 | Avansino |
| 6,078,730 | A | * | 6/2000 | Huddart et al. ............... 392/480 |
| 6,423,952 | B1 | | 7/2002 | Meisiek |

(Continued)

FOREIGN PATENT DOCUMENTS

| CN | 201229053 Y | 4/2009 |
| DE | 19948819 C2 | 5/2001 |

(Continued)

*Primary Examiner* — Thor Campbell
(74) *Attorney, Agent, or Firm* — Hudak, Shunk & Farine Co. LPA

(57) ABSTRACT

A heatable medium pipe having at least one pipe connector and heating element, wherein the heating element has a few wires, in particular two wires, and said wires extend continuously along the medium pipe and along the at least one pipe connector. In a method for producing such a heatable medium pipe, the heating element is continuously wound around a tubular medium pipe and the heating element is pre-assembled on the medium pipe in that the heating element is fastened or fixed by at least one fastening element, the medium pipe is cut to a first length for the particular application, the length corresponding to the desired medium pipe length ($l_R$) plus the heating element length ($l_H$) required for wrapping around the at least one pipe connector and the transition area the fastening element is removed in the region outside the desired medium pipe length ($l_R$), the heating element is unwrapped from the medium pipe section cut from the first length, the medium pipe is cut to the desired medium pipe length ($l_R$) to form a second medium pipe section, the medium pipe section is connected to the at least one pipe connector as the medium pipe, and the heating element is at least wrapped around the at least one pipe connector.

20 Claims, 6 Drawing Sheets

(51) Int. Cl.
  *F16L 53/00* (2006.01)
  *F24H 1/00* (2006.01)
  *F16L 25/01* (2006.01)

(56) References Cited

U.S. PATENT DOCUMENTS

| | | | |
|---|---|---|---|
| 6,626,004 B2* | 9/2003 | Lee | 62/276 |
| 7,773,867 B2* | 8/2010 | Bourget et al. | 392/468 |
| 2010/0206415 A1* | 8/2010 | Ellis et al. | 138/33 |
| 2010/0209085 A1* | 8/2010 | Ellis et al. | 392/468 |
| 2010/0263740 A1 | 10/2010 | Borgmeier et al. | |
| 2011/0299838 A1* | 12/2011 | Galati et al. | 392/468 |
| 2013/0202279 A1* | 8/2013 | Reichl et al. | 392/480 |

FOREIGN PATENT DOCUMENTS

| | | | |
|---|---|---|---|
| DE | 20 2006 003 590 | U1 | 7/2006 |
| DE | 10 2005 037 183 | B3 | 5/2007 |
| DE | 20 2007 010 502 | U1 | 1/2009 |
| DE | 202007018089 | U1 | 5/2009 |
| DE | 20 2008 003 908 | U1 | 9/2009 |
| DE | 10 2008 034 238 | A1 | 1/2010 |
| EP | 1 519 098 | A1 | 3/2005 |
| EP | 1 985 908 | A1 | 10/2008 |
| EP | 1 721 097 | B1 | 10/2009 |
| EP | 2 107 291 | A2 | 10/2009 |
| JP | 01132089 | A | 5/1989 |
| JP | 02502683 | A | 8/1990 |
| JP | 7 1397 | U | 1/1995 |
| JP | 2007524053 | A | 8/2007 |
| JP | 2009250271 | A | 10/2009 |
| WO | 2008 023021 | A1 | 2/2008 |
| WO | 2008 131993 | A1 | 11/2008 |
| WO | 2010 057819 | A1 | 5/2010 |

* cited by examiner

HEATABLE MEDIUM PIPE AND METHOD FOR PRODUCING SAME

FIELD OF THE INVENTION

The invention relates to a heatable medium pipe with at least one pipe connector and a heating element, wherein the heating element comprises a few wires or wire strands, in particular two wires or wire strands, a pre-assembled medium pipe for a heatable medium pipe, wherein the medium pipe has at least one heating element wrapped around the outside of the same, as well as a method for producing a heatable medium pipe comprising the medium pipe, at least one pipe connector, a transition area between medium pipe and pipe connector and at least one heating element, wherein the heating element comprises a few wires or wire strands, in particular two wires or wire strands.

BACKGROUND OF THE INVENTION

Heatable medium pipes and methods for producing the same are known in the art. In particular in vehicles a number of medium pipes are provided for conveying mostly liquid media. These medium pipes tend to freeze at low temperatures, which is why they are provided with heating. Pipe connectors are used to connect at least two medium pipes or to connect a medium pipe with a given aggregate. The medium pipes often convey media which due to a relatively high freezing point tend to freeze up at ambient temperatures still at a fairly high level, which means that operability of a vehicle, for example, may be greatly impaired or even interrupted. This is true, in particular, of water pipes for windscreen washer systems, and also for medium pipes where the medium is an aqueous urea solution used as a $NO_x$ reaction additive for Diesel engines with so-called SCR catalysers.

The EP 1 985 908 A1 has disclosed a pipe connector for medium pipes, which consists of a connecting piece with connecting portion for connection with the medium pipe or an aggregate and with a transition portion adjacent to the connecting portion with current channel. At least in the area of the transition portion electrical heating means are provided in an arrangement enclosing at least partially the current channel. The electrical heating means arranged in the transition portion, i.e. outside the connecting portion, are used to prevent the respective medium from freezing within the connecting piece or to reverse the freezing process by thawing the frozen medium. The heating wire or wire strand wrapped around the outside in the manner of a coil surrounds the connecting piece, wherein at least one further coil winding is arranged inside in the area of the current channel so that when a current flows through the outer heating wire an induction is provided in the inner coil winding for generating heat. The medium pipe consists of an inner pipe line with a heat conductor arranged on the circumference, wherein pipe line and heat conductor are enclosed by an outer envelope such as by a corrugated pipe. Pipe connectors are attached at both ends of the medium pipe. Prior to fitting the corrugated pipe an adhesive tape is wrapped around the heat conductor arranged on the pipe line and thereby fixed to the pipe line. Alternatively the fixing may be effected by using a varnish or adhesive layer. The heating wires of the pipe connectors and the heat output of the pipe line are electrically interconnected, wherein the heating wire of one of the pipe connectors, respectively, is electrically switched in series with one of the winding wires of the heating wire surrounding the pipe line, and the connecting ends of the two series connections at the two pipe connectors are run to outside, where a connection to a voltage source or a further connection is provided. Alternatively it is disclosed that the heating wires of the pipe connectors and the windings surrounding the pipe line are provided in the form of a series connection of all heating wires with only one outside line connection. In each case a pipe line with heating wires wrapped around it is subsequently cut to length, before being connected with the two pipe connectors and the heating wires fitted to its outside. This is disclosed for example in the DE 10 2005 037 183 B3 or EP 1 519 098 B1. Then follows an expensive connection of the individual components which have heating wires wrapped them.

As detailed in the DE 10 2005 037 183 B3 the pipe line is initially implemented as an endless pipe and subsequently cut to a defined length. This pipe already comprises the heating wire as an electrically conductive plastic layer. As an alternative this publication of the prior art discloses that the electrical feed lines are melted into the pipe. Further it is disclosed that the pipe line may comprise grooves extending as far as the heating element and clamped or glued into the electrical feed lines. Or the electrical feed lines and, as required, further components of the pipe may be extruded, which means that the electrical feed lines and the heating element are produced together within one production process.

Correspondingly, with the electrically heatable medium pipe or liquid pipe disclosed in the EP 1 519 098 B1, the heating wire is wrapped helically around an inner plastic layer with an electrically insulating tape being wrapped directly around the plastic layer and the heating wire. The heating wire is wrapped around the plastic layer in the form of a double helix, and the ends of the heating wire are connected with a plug which can be plugged into a socket or a voltage source.

Further the EP 1 721 097 B1 discloses an electrically heatable medium pipe, where the medium pipe, a cable for heating the medium pipe and at least one electrical connector for connecting the cable to the current source are provided. The medium pipe and the cable are completely received in an outer protective envelope comprising a first tube with an inner cross-section which exceeds the outer cross-section of the medium pipe. At one end or both ends of the cabling the cable is run separate from the medium pipe and within a branch piece. It is run to a second tube on the electrical connector. The outer protective envelope encompasses the first tube, the branch piece and the second tube, wherein the branch piece is arranged between the first and second tube. This means that at least on one side the cable is not run to a pipe connector but directly into the branch line and in there to a plug connector for connection to an electrical energy source. According to this publication of the state of the art therefore, it is not the pipe connector which is heated but merely the medium pipe.

The EP 2 107 291 A2 has disclosed a fluid line, where pipe connectors are attached to the ends of an elastic pipe line. A heat conductor is fitted into the pipe line and the ends thereof are pressed in between pipe connector sections arranged in the pipe connectors. The heat conductor is connected with a connecting wire by a connecting section and thereby with an energy source. The heat conductor is laid as a loop within the pipe line and ends in the area of the loop in front of the second pipe connector. Although due to the heat conductor lying inside the pipe line the heat can be introduced directly into the medium flowing inside the medium pipe or pipe line, the wires of the heat conductor must be highly resistant against the medium flowing in the medium pipe resulting in proportionally high cost as regards the heat conductor. Further it has proven to be laborious to insert the conductor loop, i.e. the doubled-up conductor into the pipe line in a desired helical or meandering configuration. Also the costs for a pipe line of this kind are higher than for pipe lines, for which the heat conductor is run on the outside, because the inner diameter, and possibly also the wall thickness of such a pipe line, through which the heat conductor is run, must be comparatively larger in order to accommodate these without creating an obstruction in the medium flow.

It has proven to be expensive, when providing pipe connectors with heating wires wrapped around them and a pipe line separately provided with heating wire, to connect the respective heating wires of pipe connectors and pipe line, since this is time-consuming and must be carried with great care in order to ensure a proper electrical connection so that production is a drawn-out process. With the previous method a heating wire is wrapped around a pipe line, and the pipe line is pre-assembled with adhesive tape or textile adhesive tape and stored on coils. To produce the respectively required heatable medium pipe the pipe with wrapped-around heating wire must then be cut to the desired length, the adhesive tape or textile adhesive tape must be removed from both ends of the cut-to-length pipe, the respective heating wire ends must again be unwrapped, the excess pipe length must be cut off, the pipe length must be adjusted, the cuts must be cleaned and the heating wire ends must be connected with corresponding heating wire ends of heating wires arranged on pipe connectors, in particular via crimping points. On the one hand, therefore, a number of process steps is required for producing the heatable medium pipe containing the wrapped-up pipe and the pipe connectors or for initially connecting pipe and pipe connectors or the heating wires arranged on them. The provision of numerous crimping points results in high production costs. Therefore costs arise from the comparatively high production expenditure. Later, when the heatable medium pipe is installed for example in a vehicle, in particular a lorry, these crimping points are exposed to vibrations which may lead to damage to the insulation at the crimping points which may result in short-circuits and the consequences connected therewith.

SUMMARY OF THE INVENTION

The present invention is based on the requirement to provide a heatable medium pipe the manufacture of which permits expenditure to be reduced to a minimum whilst avoiding a large number of joints on the heating element and, at the same time, enabling continuous production of the heatable medium pipe.

This object is solved by a heatable medium pipe having at least one pipe connector and a heating element, wherein the heating element comprises a few wire or wire strands, in particular two wire or wire strands, wherein said wires or wire strands extend continuously both along the medium pipe and along the at least one pipe connector, the same wires or wire strands extend continuously both along the medium pipe and along the at least one pipe connector. For a pre-assembled medium pipe for a heatable medium pipe, wherein the medium pipe has at least one heating element wrapped around it on the outside, the object is solved in that the pitch of the wrapping varies in sections, wherein the heating element is wrapped section-wise around the medium pipe at a lesser pitch than in the remaining wrapping area. As regards a method for producing a heatable medium pipe comprising the medium pipe, at least one pipe connector, a transition area between medium pipe and pipe connector and at least one heating element, wherein the heating element comprises a few wires or wire strands, in particular two wires or wire strands, the object is solved in that the heating element is continuously wrapped around a tubular medium pipe and the heating element is pre-assembled, having been fastened or fixed to the medium pipe by at least one fastening element, the medium pipe, depending upon the application, is cut to a first length which corresponds to the desired medium pipe length plus the heating element length required for wrapping around the at least one pipe connector and the transition area, the fastening element is removed from the area outside the desired medium pipe length, the heating element is unwrapped from the medium pipe section cut to a first length, the medium pipe in the desired medium pipe length is cut to form a second medium pipe section, the medium pipe section, as medium pipe, is connected with the at least one pipe connector, and at least the heating element is wrapped around the at least one pipe connector. Further developments of the invention are defined in the dependent claims.

In this way a heatable medium pipe is produced, where one and the same wire or wire strands extending along the medium pipe also serve to heat the one or more connectors and extend along the same. This means that one common heating element is used for heating the medium pipe and one or more pipe connectors. Their wire or wire strands thus extend without interruption along the medium pipe and along the at least one pipe connector. In contrast to the prior art no provision is made for additional wire or wire strands to heat the pipe connectors, thereby omitting the wires or wire strands provided on the pre-assembled pipe connectors and thus also the joints required between these wire or wire strands and those along the medium pipe. Joints between medium pipe and pipe connector are therefore not provided, but a joint may be provided between two wires or wire strands or to cold conductors or electrical connectors for connecting the wire or wire strands of the heating element to a current or voltage source. To start with a pre-assembled medium pipe with heating element wrapped around it is used, wherein a fastening element, in particular an adhesive tape, a textile adhesive tape or a textile tape fixes the heating element on the outside of the medium pipe. This pre-assembled medium pipe is cut to a first length corresponding to the desired application-specific length plus an additional length which comprises a heating element length sufficient for wrapping around the pipe connectors to be connected with the medium pipe and possibly also for further devices connected therewith. After cutting the pre-assembled medium pipe to a first length the fastening element is initially removed, the heating element is then unwrapped in the additionally cut-to-length section of the cut-to-length medium pipe section, so that at the ends of the medium pipe section, free heating element is available, in particular two wires or wire strands of the heating element at both ends of the medium pipe section. Thereafter the initially added surplus section at one or both ends of the medium pipe section is then also cut off. What remains is the medium pipe section twice cut-to-length, which in the following is called the medium pipe. Of the remaining wrapped-up medium pipe of application-specific length the overshooting end of the heating element remains free, at least on one side, for wrapping up the pipe connector to be connected with the medium pipe. In a further processing step the substantially tubular medium pipe is then connected with the at least one pipe connector in order to complete the fluid path. The connection between the medium pipe and the one or two pipe connectors which are joined to ends of the medium pipe may be effected by indenting or lasering, for example. The heating element unwrapped from the respective partial section of the medium pipe deliberately cut too long is then wrapped or fitted onto the respective pipe connectors in order to provide heating for these as well. In contrast to the prior art it is therefore not a pipe connector already provided with heating element, which is connected with the pre-assembled medium pipe, but a pipe connector still without any heating element. This means that no crimping points or other connecting points of the heating element are necessary at the transition from the medium pipe to the pipe connector. Fastening to the pipe connectors may, for example, be effected by providing form elements and/or other fastening elements such as adhesive tape, textile adhesive tape or textile tape.

Advantageously the wire or wire strands extend without any joints in the transition area between medium pipe and pipe connector and continuously along the pipe connector and the medium pipe on the outside thereof. In this way it is possible to keep the entire transition area between medium pipe and pipe connector free from joints. In particular in the transition area from the substantially less rigid medium pipe to the very rigid pipe connectors joints may be very susceptible to damage caused by vibrations. It is therefore advantageous not to provide any connections to cold conductors or electrical connectors or in particular between the two wires or wire strands extending continuously along the medium pipe and pipe connectors.

The free heating element ends or wire or wire strand ends arranged in the area of the one or more pipe connectors may be connected and thus closed or they may be connected to a respective cold conductor or electrical connector in order to thereby provide a connection to a feed-in connector for connecting a current or voltage source. A direct connection of the open ends of the heating element with a feed-in connector for connecting to a current or voltage source is also possible.

Prior to connecting the medium pipe section with the at least one pipe connector a device for the protection and/or insulation of the medium pipe may be arranged about the same, in particular a corrugated pipe may be pushed axially onto the same. In principle it is also possible, insofar as already two pipe connectors have been connected with the medium pipe at its ends, to fit a protection device laterally, i.e. radially onto the medium pipe, in particular a corrugated pipe slit in longitudinal direction.

Further, at least one device for the protection and/or insulation of the pipe connector and/or the transition area may be arranged about the same between medium pipe and pipe connector, in particular protective caps for enveloping the at least one pipe connector and the at least one transition area to the medium pipe for surrounding these and/or the protection and insulation device around them, for example a corrugated pipe. Such protective caps will then surround not only the pipe connectors and the transition area to the medium pipe, but also part of the corrugated pipe enveloping these, so that a complete unit is provided between the tubular medium pipe and the pipe connectors for forming a completely heatable medium pipe, wherein also a branching point of the heating element for connecting the same to an energy source may be protected against damage by enveloping it using such protective caps.

It has proven to be particularly advantageous to wrap the heating element at a section-wise varying pitch onto the medium pipe over the longitudinal extension of same. This offers the possibility of providing a heating element reserve in sections of the pre-assembled medium pipe. This makes it possible to disconnect sections from the pre-assembled medium pipe, which at their ends already have the desired heating element reserve, so that a sufficient length of heating element exists for wrapping heating element around the pipe connectors. The end sections disconnected or to be discarded from the medium pipe following unwrapping of the heating element required for wrapping up the pipe connector may be shorter here than if the heating element were provided with an even pitch on the outside of the medium pipe.

In particular, the heating element is arranged in sections at a lesser pitch than in the remaining wrapping area of the medium pipe. Along the main extension of the medium pipe the heating element may be provided at a comparatively large pitch, in particular a pitch of approx. 20-150 mm, in particular a pitch of 40-80 mm on the medium pipe. The heating element may be arranged in a meandering fashion and/or in the form of elongated waves and/or preferably in a spiral fashion. In principle it is even possible to run the wire or wire strands of the heating element parallel to the medium pipe since this already allows to introduce sufficient heat and at the same time permits an efficient material input as regards wire or wire strand length. A lesser pitch of the heating element wires or wire strands would then have to be provided only in sections for providing a heating element reserve. However, if the medium pipe is form-bent it is more advantageous to provide the wires or wire strands about the medium pipe with a pitch, which is less than infinite. A large pitch, as a rule, is albeit sufficient as regards energy and makes a sufficient introduction of heat possible. From a technical aspect, however, the pitch of the heating element wires or wire strands along the medium pipe advantageously amounts to only 150 mm maximum. With pitches of over 150 mm, if the medium pipe is bent, there is the problem that the wire or wire strand does not follow the bend of the medium pipe but lifts off the same. The most favourable pitch, as a compromise for technical and economical reasons, therefore is a pitch of for example in the range of 40 to 80 mm, in particular with regard to the heating element wire or wire strand length which must be provided, and the technical practicability when enwrapping the tubular medium pipe.

In order to produce a uniform heat input in the area of the one or more pipe connectors and the medium pipe as well as in the transition area between medium pipe and pipe connector a varying pitch adapted to requirements may be provided during wrapping. A large pitch of up to 150 mm may be provided, respectively, along the medium pipe whereas in the transition area to the pipe connectors and along the same a lesser pitch appears to make more sense so that the heat input along the entire length of the heatable medium pipe may be kept approximately constant or may be raised at those points at which a particularly high heat input is necessary. The influence of the pitch of the wires or wire strands is high in the area of the medium pipe with regard to the material input, since the medium pipe may be as long as 4.5 m for example, whereas the influence in the area of the pipe connectors is small since here only short dimensions are enwrapped. With regard to the heat input this is 15 Watt per meter for the medium pipe and 1.5 Watt per pipe connector. In contrast to the large pitch along the medium pipe of in particular up to 150 mm, a pitch of 3 mm may be provided along the pipe connector. If a small pitch is provided in the area of the pipe connectors a spiral and/or meander-shaped winding or a strung-out winding about the pipe connectors may be provided. Mixed winding shapes such as meandering, spiral-shaped or strung-out shapes or winding shapes varying between the pipe connectors, the transition area and the medium pipe are also possible.

The wire or wire strand thickness of the heating element or its diameter or the core sire of the heating element, in particular of the insulated metallic core, may be less than 0.2 mm, in particular 0.12 mm, 0.14 mm, 0.18 mm, with a tolerance of respectively ±0.4 mm, as required. Intermediate values are of course also possible, e.g. a wire or wire strand thickness of 0.10 mm, 0.11 mm or less than 0.12 mm.

The medium pipe may have an internal diameter of between 2 and 4 mm, in particular approx. 2 mm. Provision of such an internal diameter has proven to be a particularly economic variant. The wall thickness of the tubular medium pipe may be, for example, between 0.5 and 1 mm, in particular 0.7 mm. The air gap between the outside of the tubular medium pipe and the inside of the corrugated pipe surrounding the medium pipe and the wires or wire strands wrapped around the same may be approx. 0.1 to 0.4 mm, in particular 0.1 to 0.2 or 0.2 to 0.4 mm. Such an air gap is sufficient to ensure good heat insulation. Fixing of the wires or wire strands of the heating element to the outside of the tubular medium pipe may be effected, as already mentioned, by an adhesive tape, a textile adhesive tape or a textile tape. In principle other fixing methods are also suitable, but wrapping with an adhesive tape, a textile adhesive tape or a textile tape has proven to be cost-effective and very good as regards reliability of the fixing.

The wire or wire strand may be connected to form a continuous part, wherein in particular two identical wire or wire strands are provided which are joined together. This results in a continuous wire or wire strand when connecting the two wires or wire strands within the pipe connector, thereby allowing further connecting or crimping points to be advantageously omitted. Such crimping points of heating elements, in particular heating wires, are, in principle, predetermined breaking points, since they tend to break when being constantly impacted by transverse forces. Such transverse forces occur through shocks, vibrations and other negative forces during operation of a vehicle, in particular a lorry. Any breaks at these joints or crimping points not only cause a quality problem but also, if the insulation is damaged, bring with it the danger of a short-cut. This can be advantageously avoided by providing wires or wire strands without joints. As already mentioned, this then only requires a joint at the pipe connector, wherein the wires or wire strands may then be either joined together at their ends or with cold conductors or electrical connectors or other devices for connection to a current or voltage source.

Further the wire or wire strands may be unconnected or indirectly connected, in particular via a further line. A line may, for example, be formed by two individual lines in series, wherein the formed total line may then comprise three plug connectors. One plug connector is used for connection to a current or voltage source and two plug connectors are used for the internal connection of the lines to each other. The provision of cold conductors or electrical connectors for connection to a current or voltage source could then be waived.

The wires or wire strands may be wrapped around the pipe connector in a spiral and/or meandering fashion or may be arranged about the pipe connector in a strung-out fashion. In particular for meanders on the outside of the pipe connector form elements may be arranged in the area, which support the meander. In particular the wires or wire strands may be clamped into or between such form elements in order to maintain their position.

Advantageously the heating element may be adaptively wrapped around the tubular medium pipe during pre-assembly and/or adaptively fitted to the medium pipe and/or the pipe connector, in particular it is possible to adaptively attach the wires or wire strands, a fastening element for fastening the wire or wire strand on the medium pipe and/or an insulation and/or protection device for the insulation or protection of the medium pipe and/or the pipe connector and/or the transition area between medium pipe and pipe connector. Adaptively fitting or attaching means providing wires or wire strands which are adapted to the respective requirements of the particular application. This precludes using a predefined arrangement and heating element amount as used for the pre-assembled medium pipe according to the state of the art. Rather, due to enwrapping the whole assembly for conducting the medium after it has been assembled, the wires or wire strands may be arranged exactly at those points, at which a heat input into the medium pipe and the pipe connectors is desired or is necessary. Due to adaptively attaching the heating element or its wire or wire strands, medium pipes may be offered in different variants. In particular in comparison to wire or wire strands which are integrated with the wall of pipe lines as medium pipes, a medium pipe to which the heating element or its wires or wire strands are adaptively fitted can be provided with windings at a most varied pitch and in the most varied form, or with the heating element. If the wire or wire strands are embedded into the pipe wall of the medium pipe, this operation is part of the extrusion process of the medium pipe, and it is therefore always more complicated and more expensive to vary this operation. Compared to embedding the wires or wire strands into the pipe wall of the medium pipe it is possible, furthermore, during adaptive wrapping or attaching of the heating element to the medium pipe, to provide the tubular medium pipe with a comparatively lesser wall thickness, thereby reducing material input.

A heatable medium pipe is thus provided, where heating of the medium pipe itself and of the pipe connectors connected to it is effected via the heating elements or wire or wire strands which are or were provided on the pre assembled medium pipe. This helps to avoid numerous joints in the wire or wire strands of the heating element. It also means that it is not necessary to provide for a large variety of wire or wire strands which would otherwise have to be stored for respective applications and be arranged on pipe connectors and tubular medium pipes during pre-assembly. By contrast it is now possible to pre-assemble a medium pipe equipped with heating element, wherein an advantageous adaptive attachment of the heating element to the medium pipe results in an adaptation being achieved to suit the desired heat output. By avoiding joints between wires or wire strands of the pipe connectors and wires or wire strands of the heating element fitted to the medium pipe it is further possible to realise a compact construction, since the wires or wire strands already arranged on the medium pipe are merely passed to the pipe connectors and used for heating these.

It has further proven to be advantageous to provide for a continuous wrapping process involving the heating element with fastening elements being wrapped around the medium pipe, as this is cost-effective and at the same time flexible, since it is possible for the continuous wrapping, in particular also with regard to the pitch and the provision of a section-wise varying pitch of the heating element wrapping on the medium pipe, to be flexibly adapted to the respective application. It is thus possible to store different medium pipes equipped with heating element and fastening means in the form of wrapped coils, wherein, in particular, the distances of the section-wise heating element reserve can be adapted to suit the respective intended use.

BRIEF DESCRIPTION OF THE DRAWINGS

For further explanation of the invention embodiments of the same will now be described in detail with reference to the drawings, in which.

DETAILED DESCRIPTION OF THE INVENTION

Figure 1A:
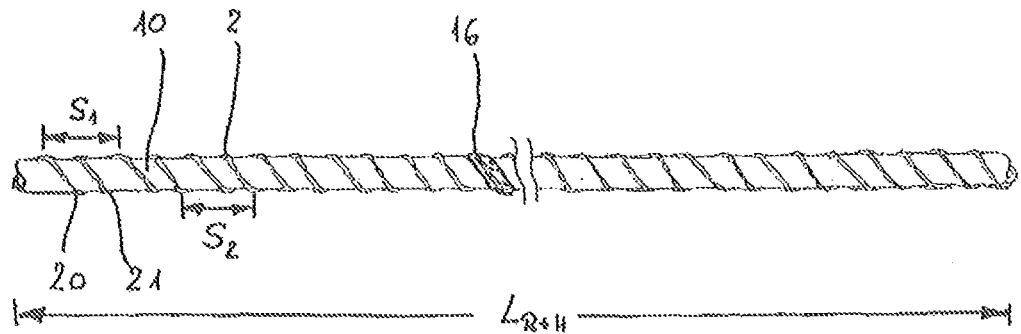
FIG. 1a shows a side view of a medium pipe with two wires or wire strands of a heating element wrapped around it and which has been cut to length in a first process step according to the invention.

FIG. 1a shows a tubular medium pipe 10 with a heating element 2 wrapped around it. The heating element comprises two wire or wire strands 20, 21. The tubular medium pipe 10 with the two wires or wire strands 20, 21 wrapped around it is a pre-assembled section of a long medium pipe obtained by a continuous enwrapping process of a tubular pipe. The first wire or wire strand 20 is wrapped at a pitch $S_1$ and the second wire or wire strand 21 is wrapped at the pitch of $S_2$, wherein the two pitches are equal two each other or may vary slightly from each other for an optimal heat input into the medium pipe. The two wires strands are fastened to the outer surface of the medium pipe 10 by a fastening element 16, wherein this fastening element may be an adhesive tape, a textile adhesive tape or a textile tape. FIG. 1a shows merely an indication of this.

Figure 1B:
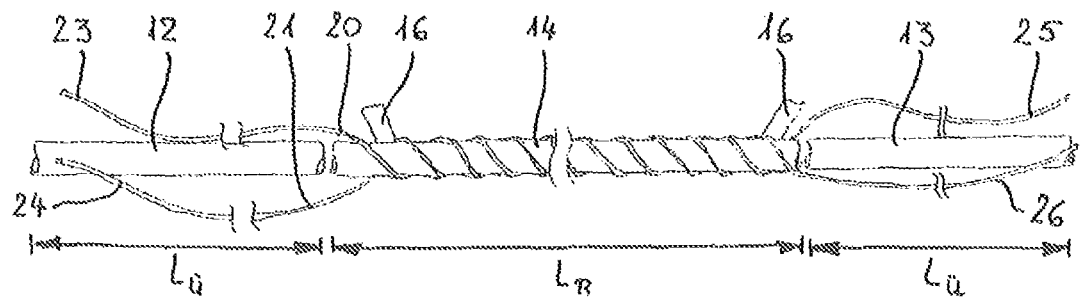
FIG. 1b shows a side view of the medium pipe according to FIG. 1a in a second process step according to the invention, wherein the wire or wire strands are unwrapped from a section of the medium pipe at the ends and the medium pipe is cut to length again.

The tubular medium pipe 10 according to FIG. 1a is cut to a length $L_{R+H}$. This length corresponds to the desired medium pipe length $l_R$ plus the length, onto which the desired heating element length $l_H$ has been wrapped for enwrapping the pipe connectors with which the medium pipe is equipped for connecting to an aggregate etc. in a vehicle. FIG. 1b shows the surplus lengths provided at both ends of the cut-to-length medium pipe 10, or medium pipe ends 12, 13. The free heating element ends or wires or wire strand ends 23, 24, 25, 26 are also shown in FIG. 1b. These four free wire or wire strand ends of the two wires or wire strands 20, 21 were previously arranged on the medium pipe ends 12, 13 cut-to-length with the surplus length. Following unwrapping of the wires or wire strands ends 23, 24, 25, 26 from the two medium pipe ends 12, 13, these are separated from the central medium pipe section 14, as indicated in FIG. 1b. The central medium pipe section 14 has the desired medium pipe length $l_R$, which is required for the respective application case. For example, the medium pipe length $l_R$ may here be 4.5 m or only 0.2 m. This depends upon the respective later purpose or location, where the heatable medium pipe is to be used.

Figure 1C:
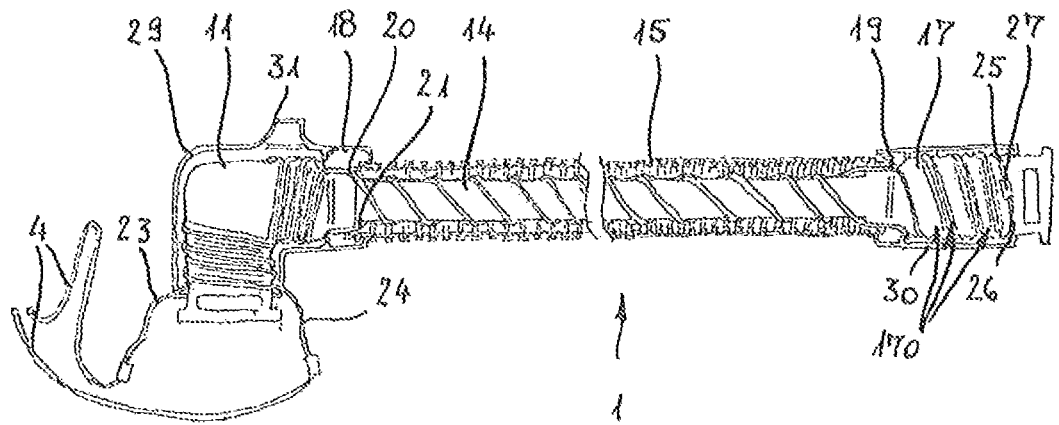
FIG. 1c shows a side view of the medium pipe according to FIG. 1a in a third process step according to the invention, in which two pipe connectors have wire or wire strands wrapped around them and in which a corrugated pipe and protective caps have been fitted.

Following separation of the two medium pipe ends 12, 13 the two cutting edges of the central medium pipe section 14 are cleaned, whereafter a corrugated pipe 15 is axially pushed onto the medium pipe or its central medium pipe section 14, wherein the corrugated pipe fully encloses the medium pipe section. Next a first pipe connector 11 is fitted at one end of the central medium pipe section 14 and a second pipe connector 17 is fitted at the other end, in particular by indenting or lasering or another joining process. After connecting the medium pipe section 14 with the two pipe connectors 17, 18, i.e. after connecting the "fluidic" parts of the heatable medium pipe, i.e. the part through which the fluid can flow, the wire or wire strand ends 23, 24 are used to wrap around the first pipe connector 11, and the two wire or wire strand ends 25, 26 are used to wrap around the second pipe connector 17. There are therefore no longer any wire or wire strand crimping points in the transition areas 18, 19 between the central medium pipe section 14 and the two pipe connectors 11, 17. Rather the wires or wire strands 20, 21 are wrapped/arranged in one piece continuously from the medium pipe across and beyond the two pipe connectors. The pitch of the winding may vary at the two pipe connectors 11, 17 in comparison to the medium pipe. As seen in FIG. 1c, the two wires or wire strands 20, 21 are wound at an approximately constant winding pitch, in the two transition area 18, 19 the two wires or wire strands 20, 21 are run approximately parallel and on the two pipe connectors 11, 17 the wires or wire strands are wound at a distinctly lesser pitch, whereby the pitch further differs at the two pipe connectors 11, 17.

The respective wire or wire strand ends 23, 24, 25, 26 may be connected with cold conductors or electrical connectors 4, for example, which serve as connection to a current or voltage source. This has been indicated on the first pipe connector 11 and on all wire or wire strand ends in FIG. 5. Further, the wire or wire strand ends may also be joined together as indicated by the crimping point 27 on the second pipe connector 17 and in FIG. 4. The result is a closed loop of the two wires or wire strands 20, 21, which then comprises merely two open ends, i.e. the two wire or wire strand ends 23, 24, which are connected to cold conductors or electrical connectors 4, as shown in FIG. 1c.

The wire or wire strand ends 23, 24, 25, 26 may be retained by form elements on the outside of the pipe connectors 11, 17 as indicated in FIG. 1c. Further, the outer surface of the pipe connectors may be provided with a corresponding structuring such as a rib structure 170 or a form-element-forming structure. I.e. ribs or furrows or grooves may be provided, into which the wire or wire strand ends may be embedded. This permits a stable positioning. It is also possible, in addition to embedding the wires or wire strands in or between form elements, to provide fixing or fastening by providing a fastening element such as an adhesive tape, textile adhesive tape or textile tape 16 for fixing the positioning of the wires or wire strands 20, 21 of the heating element 2 along the medium pipe.

As can further be seen in FIG. 1c, following the wrapping of the wires or wire strands 20, 21 around the pipe connectors 11, 17, protective caps 29, 30 are provided for the protection and insulation of the two pipe connectors 11, 17 and for covering the two transition areas 18, 19 to the medium pipe section 14 and also for covering part of the corrugated pipe 15. Due to the air gap or air space between the outside of the pipe connectors or the transition areas or the corrugated pipe and the respective inside of the protective caps, good insulation is possible. Since the two pipe connectors 11, 17 have different shapes, i.e. the pipe connector 11 has an angled shape, whereas the pipe connector 17 is shaped straight, the protective caps 29, 30 are also shaped differently for protection and for insulation.

Figure 1D:
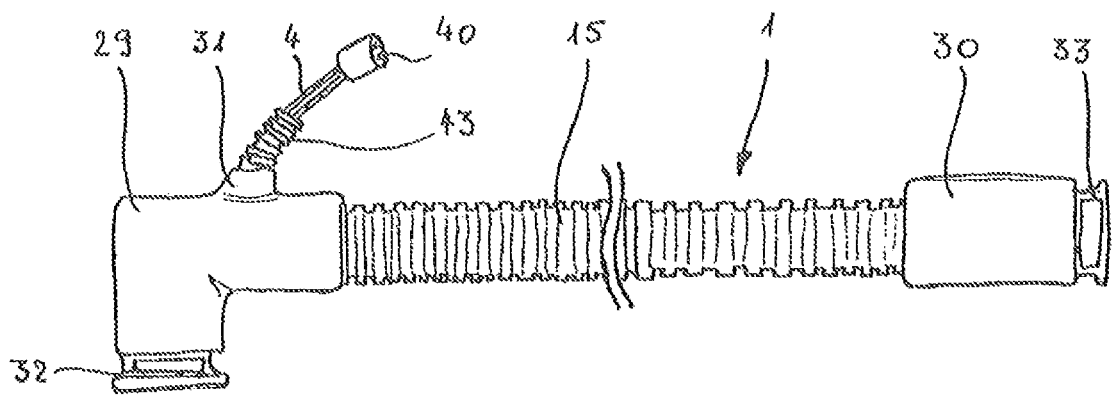
FIG. 1d shows a side view of the assembled heatable medium pipe according to the invention.

The protective cap 29 comprises a connecting branch 31 by means of which the cold conductors or electrical connectors 4 are run to the outside of the protective cap 29. The connecting branch may be joined to an enveloping device for the cold conductors or electrical connectors or may be partially received therein, such as a corrugated pipe 43, for example. Thereby the cold conductors or electrical connectors can be run safely to outside in a kink-resistant and stable manner for connecting the heating element to a current or voltage source. This can be seen in FIG. 1d, wherein the cold conductors or electrical connectors are provided with a corresponding plug connector 40 for connection to a current or voltage source. As further revealed in FIG. 1d, the two protective caps 29, 30 comprise connection apertures 32, 33 on both ends, respectively, for inserting retaining elements for retaining a plug or plug connector therein for connection to an aggregate or other lines.

Figure 2A:
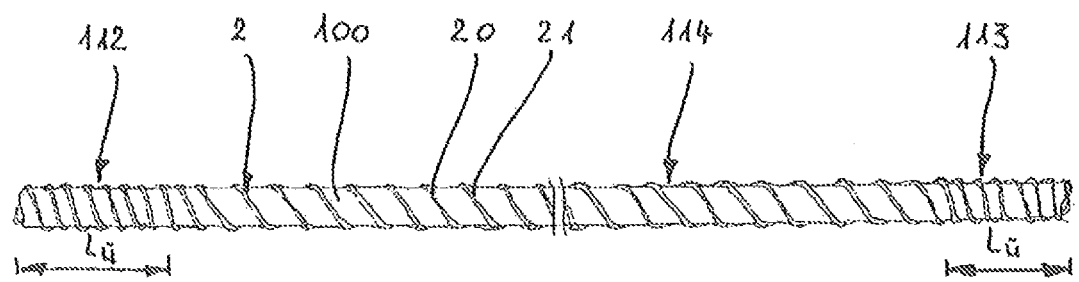
FIG. 2a shows a side view of a second embodiment of the medium pipe according to the invention.

FIG. 2a shows a side view of another variant of the pre-assembled medium pipe. This medium pipe 100 has both wires or wire strands 20, 21 of the heating element 2 wrapped around it, wherein the pitch of this wrapping varies beyond the length of the medium pipe. The pitch of the wrapping at the two medium pipe ends 112, 113 respectively is less than in the central medium pipe section 114. The wire or wire strand wrapping provided here is thus selective the medium pipe 100 being pre-assembled in such a way that in sections, the wires or wire strands are wrapped at a lesser pitch respectively, in order to have sufficient wire or wire strand left for wrapping around the pipe connectors once a heatable medium pipe has been produced from which pieces have been cut off. The advantage of this variant compared to FIGS. 1a and 1b is that the medium pipe ends 112 and 113 are shorter than the medium pipe ends 12 and 13, thereby saving on the amount of material used for the medium pipe.

Figure 2B:
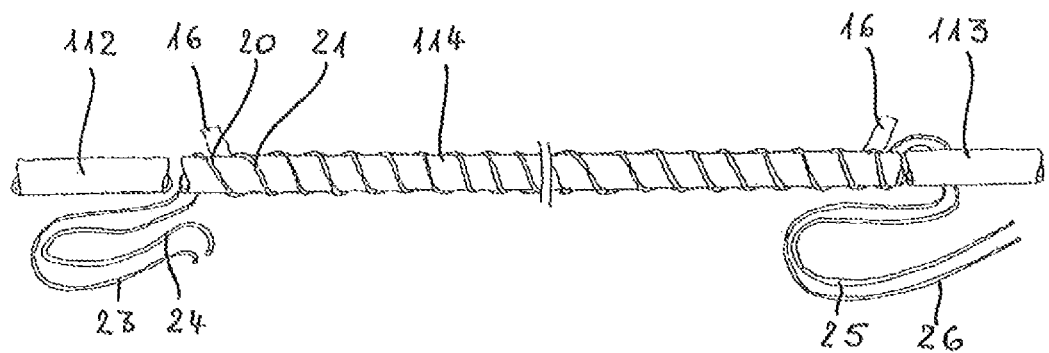
FIG. 2b shows a side view of the medium pipe according to FIG. 2a with wires or wire strands of a heating element, which have been unwrapped from the ends.

A medium pipe pre-assembled in this way is then processed further in that pieces are always cut off in the area of the lesser wrapping pitch, so that the cut-off pipe pieces of the tubular medium pipe 100 to be discarded are shorter in comparison to the solution of FIG. 1a, where the medium pipe ends 12, 13 to be cut off and discarded are longer than the medium pipe ends 112, 113 according to FIG. 2b. The respective surplus length $l_0$ is thus less in the embodiment of FIG. 2a than in the embodiment of FIG. 1b. Due to the wrapping at a lesser pitch more wire or wire strand length can be accommodated on a lesser medium pipe length.

Further processing of the medium pipe 100 or the central medium pipe section 114 according to FIG. 2b may be effected as described with reference to FIGS. 1a to 1d.

Figure 3:
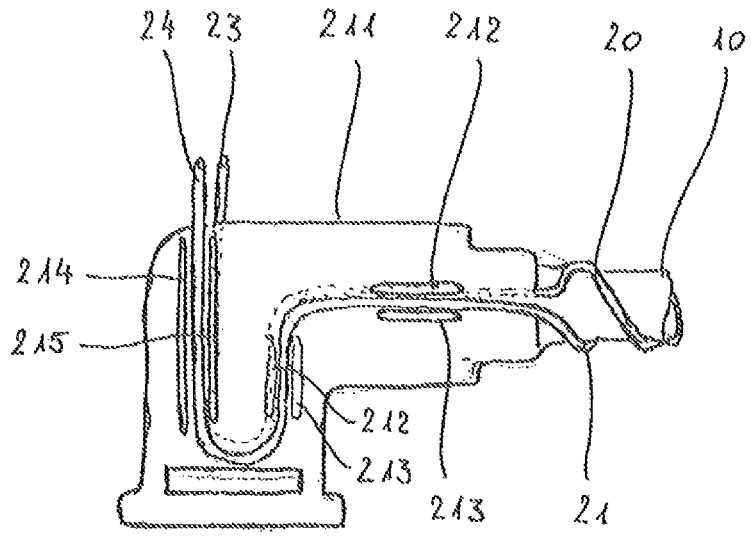
FIG. 3 shows a side view of a pipe connector equipped with wire or wire strands run in a meandering fashion according to the invention.

FIG. 3 shows a side view of a further embodiment of a pipe connector 211. The pipe connector is angle-shaped and provided on the outside with form elements 212, 213, 214, 215 which are used for retaining the wire or wire strands 20, 21 on the outside of the pipe connector 211. The wire or wire strand ends 23, 24 coming from the tubular medium pipe 10 connected with the pipe connector 211 are initially run in parallel through two form elements 212, 213 arranged parallel to each other. The two wires or wire strands on both opposing sides of the pipe connector 211 are then laid in the manner of a meander pattern forming an angle and passing through two further form elements 212, 213, laid in the form of a 180° loop followed by being passed through two further form elements 214, 215.

Instead of the illustrated positioning of the two wires or wire strands 20, 21/the wire or wire strand ends 23, 24, any other meander and/or wave-shaped and/or spiral-shaped and/or parallel-shaped pattern of the wires or wire strand ends may be provided. The choice of the path of the two wire or wire strand ends is advantageously chosen depending upon the desired heat input for heating the medium flowing when in operation through the pipe connector 211. The same applies to the pitch along the medium pipe. For example, in an embodiment of FIG. 1c for a heatable medium pipe 1, a heat input of 1.5±0.5 Watt electrical power per pipe connector may be provided in the first pipe connector 11 for an intended wire or wire strand length, of 300±100 mm, wherein the total of both wire or wire strand ends 23, 24 is taken. For the second pipe connector 17 also a heat input of 1.5±0.5 Watt thr an intended wire or wire strand length of 300±100 mm per pipe connector may be provided. The tubular medium pipe/the central medium pipe section 14, 114 arranged between the two pipe connectors 11, 17, by comparison, may have an electrical input of 15±5 Watt per pipe length meter for an intended wire or wire strand length of 2000 to 3000 mm, in particular 2200 to 2400 mm per meter of pipe length, wherein again the total of both wires or wire strands 20, 21 is taken.

Figure 4:
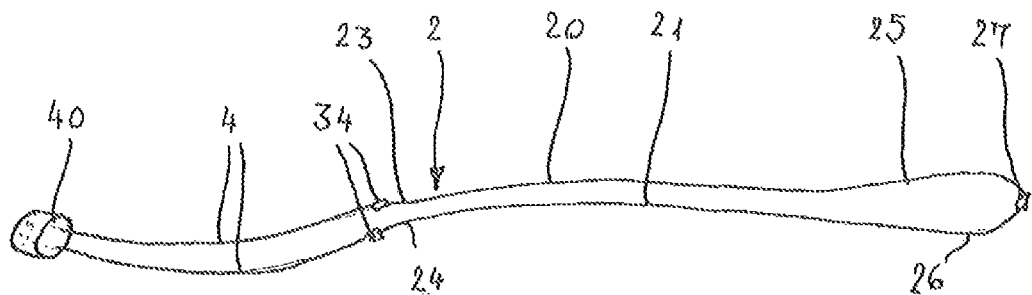
FIG. 4 shows a top view of a heating element according to the invention with two wires or wire strands joined together.
Figure 4A:
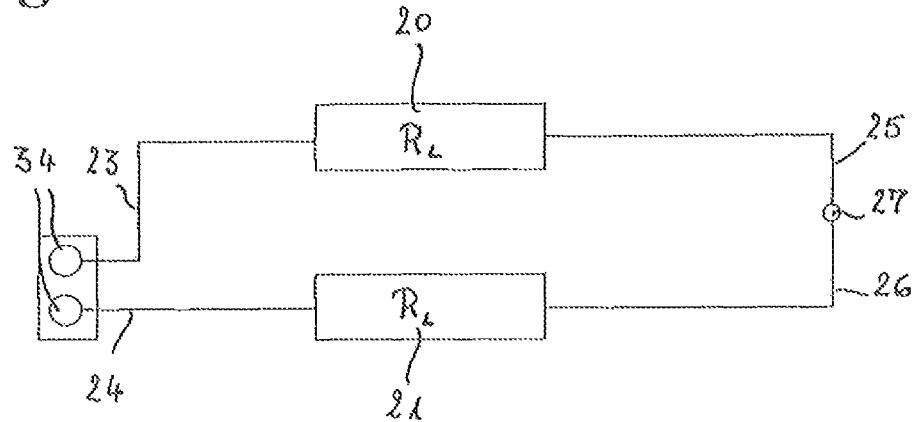
FIG. 4a shows an electrical replacement circuit diagram of the heating element with a cold conductor or electrical connector connection according to FIG. 4.

FIG. 4 shows a top view of the heating element 2 with the two joined-together wires or wire strands 20, 21. The joining or crimping point 27 shown in FIG. 1c is shown here also. As no further crimping point is required, no further joining or crimping points are shown in the electrical circuit diagram in FIG. 4a either. Therefore only the resistances of the two wires or wire strands 20, 21 have to be considered. The two joining points 34 to the cold conductors or electrical connectors 4 connected with the plug connector 40 are provided at the wire or wire strand ends 23, 24, the two wire or wire strand ends 25, 26 are joined together via the crimping point 27.

Figure 5:
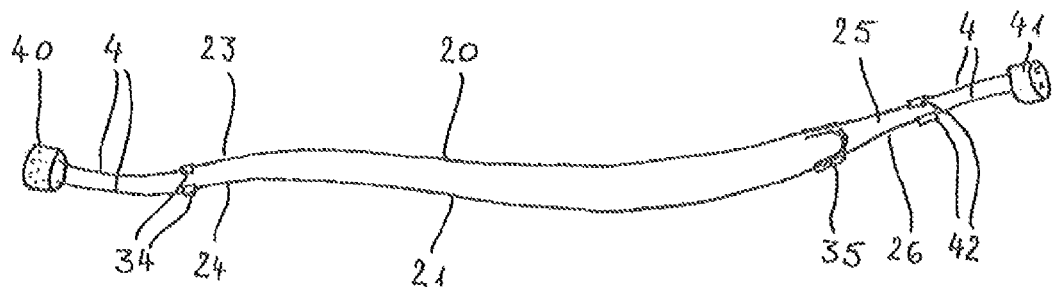
FIG. 5 shows a top view of a further embodiment of the heating element according to the invention with two wire or wire strands equipped at their ends with cold conductor or electrical connector connections and plug-in connectors respectively.

With the heating element shown in FIG. 5 all wire or wire strand ends 23, 24 and 25, 26 are left open and connected with corresponding cold conductors or electrical connectors, which in turn are connected with respective plug connectors 40, 41 to be plugged into an electrical current or voltage source. In order to fix the two wire or wire strands 20, 21 in the pipe connector, a strap element 35 is provided. This is connected with both the wire or wire strand 20 and the wire or wire strand 21, as shown in FIG. 5. Due to the stirrup shape of the strap element 35 it is possible to fix this, for example, on a centring pivot of the pipe connector, by slinging the stirrup-shaped element over the centring pivot. The wire or wire strand ends 25, 26 of the two wire or wire strands 20, 21 with joined cold conductors or electrical connectors 4, like the opposing ends of the two wires or wire strands, may emerge from the medium pipe as branching lines. This would then correspond to the embodiment variant shown in FIG. 1d, wherein due to the protected emergence of the cold conductors or electrical connectors from the protective cap the connection between cold conductor or electrical connector and heating element or wires or wire strands is secured against vibrations, as they can occur for example in operation, in particular, when fitted in a lorry, and no longer cause the heating element to involuntarily detach itself from the cold conductor or electrical connector; thus substantially avoiding such an occurrence.

Instead of providing cold conductors or electrical connectors connected to the wire or wire strand ends, the wire or wire strand ends themselves can be run into a plug connector 40, 41 and via these can be connected to a current or voltage source. Furthermore, such a connection can also be directly integrated with a pipe connector or a protective cap.

Figure 5A:
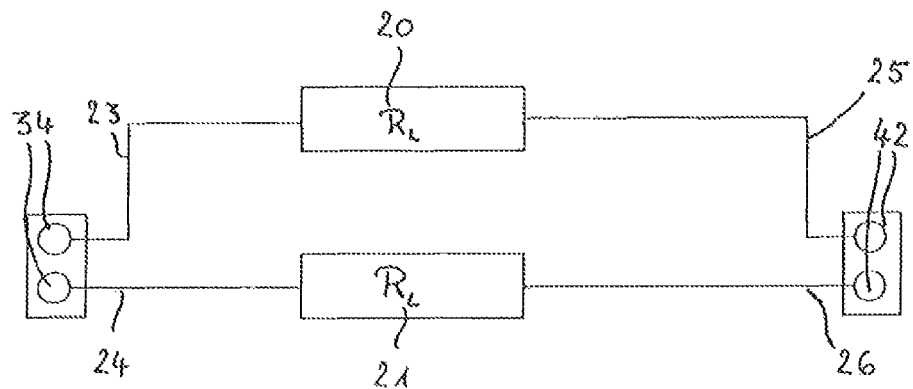
FIG. 5a shows an electrical replacement circuit diagram of the heating element with two cold conductor/electrical connector connections at the ends according to FIG. 5.

As revealed in the replacement circuit diagram in FIG. 5a, the parallel connection of the two wires or wire strands 20, 21 only comprises four joining points 34, 42 to the four cold conductors or electrical connectors, but no further crimping points.

When enwrapping the medium pipe the pitch may vary slightly along the longitudinal extension of the medium pipe, which results from exhausting the tolerance span and providing a pitch within a tolerance. It is also possible during continuous wrapping from one end of the medium pipe to the other, to deliberately vary the pitch in order to create a heating element reserve or to generate a varying heat input into the same across the longitudinal extension of the medium pipe. Depending upon the area in which a particular large heat input is desired, a partially variable pitch or a lesser pitch may be provided for a desired higher heat input.

Figure 6:
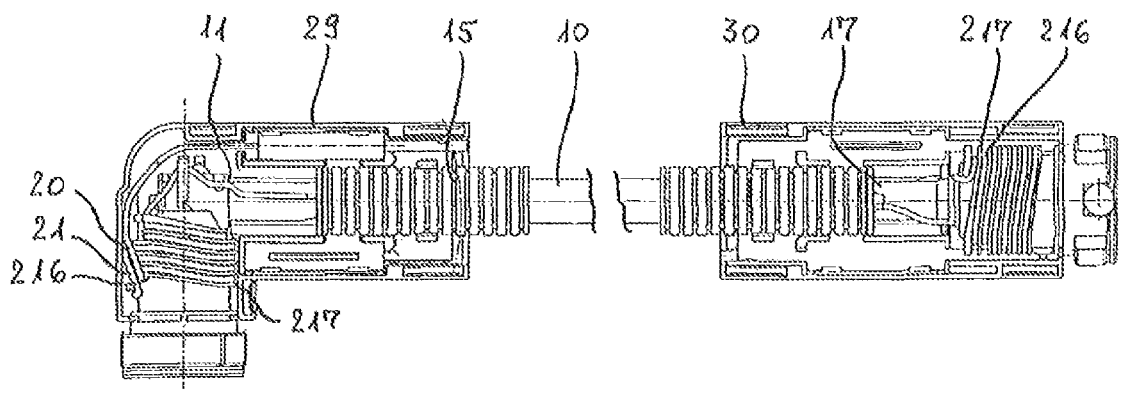
FIG. 6 shows a top view of a further embodiment of a fully assembled heatable medium pipe with open protective cap.
Figure 7:
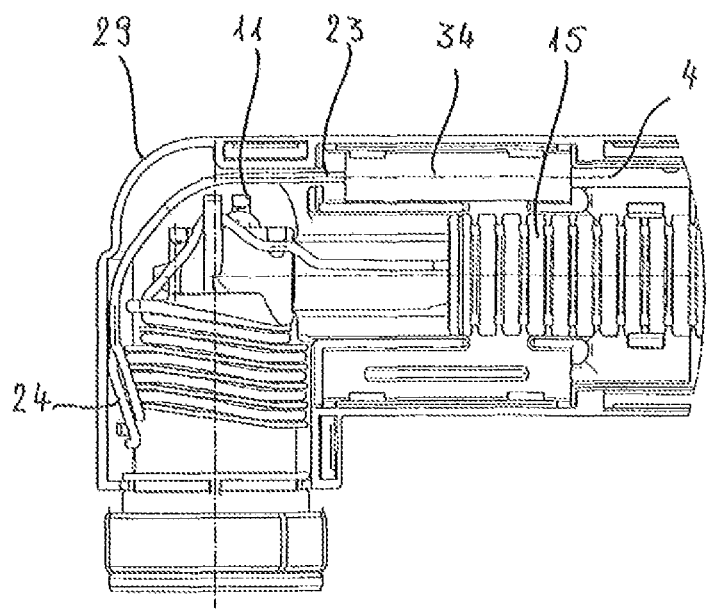
FIG. 7 shows a detail of the angled pipe connector according to FIG. 6.

As revealed particularly well in FIGS. 6 and 7, the wires or wire strands 20, 21 may be run in winding grooves 216 on the outside of the one or more pipe connectors 11, 17. The winding grooves are limited or formed by protruding ribs 217 or form elements on the outside of the pipe connector. This makes it possible to achieve an unequivocal positioning of the wires or wire strands on the outside of the pipe connectors, thereby precluding fixing by an adhesive tape, a textile adhesive tape or a textile tape, as provided along the medium pipe. If such winding grooves are not provided, the fixing of the wire or wire strand or wires or wire strands of the heating element 2 in the area of a pipe connector 11, 17 may of course also be effected, for example by an adhesive tape, textile adhesive tape or textile tape or another fixing device.

Figure 8:
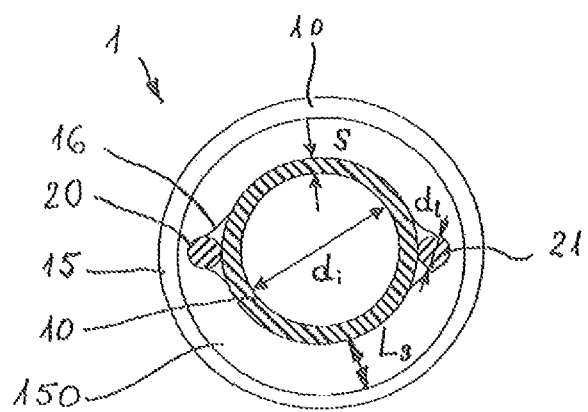
FIG. 8 shows a cross-section through the heatable medium pipe according to the invention with a wire or wire strand running parallel to the medium pipe.

FIG. 8 shows a cross-section through the fully assembled heatable medium pipe 1 in the area of the tubular medium pipe 10, wherein the two wires or wire strands 20, 21 of heating element 2, at this point, are arranged on opposing sides of the tubular medium pipe 10. Fixing of the wire or wire strand by adhesive tape, textile adhesive tape or textile tape 16 is also indicated, as is the enveloping with the corrugated pipe 15. The inner diameter $d_i$ of the tubular medium pipe 10 may, for example, be between 2 and 4 mm, in particular 2 to 3 mm. The wall thickness s of the tubular medium pipe 10 may be 0.5 to 1 mm, in particular 0.7 mm. The wire or wire strand 21 may have a diameter of $d_f$=0.12 to 0.18, in particular 0.14 mm. The air gap 150 remaining between the outside of the medium pipe 10 and the inside of the corrugated pipe 15 may be $L_S$ between 0.1 and 0.4 mm, in particular 0.2 mm, wherein, if a corrugated pipe is provided, the air gap is larger at the peaks of the waves than it is in the troughs of the waves.

Figure 9:
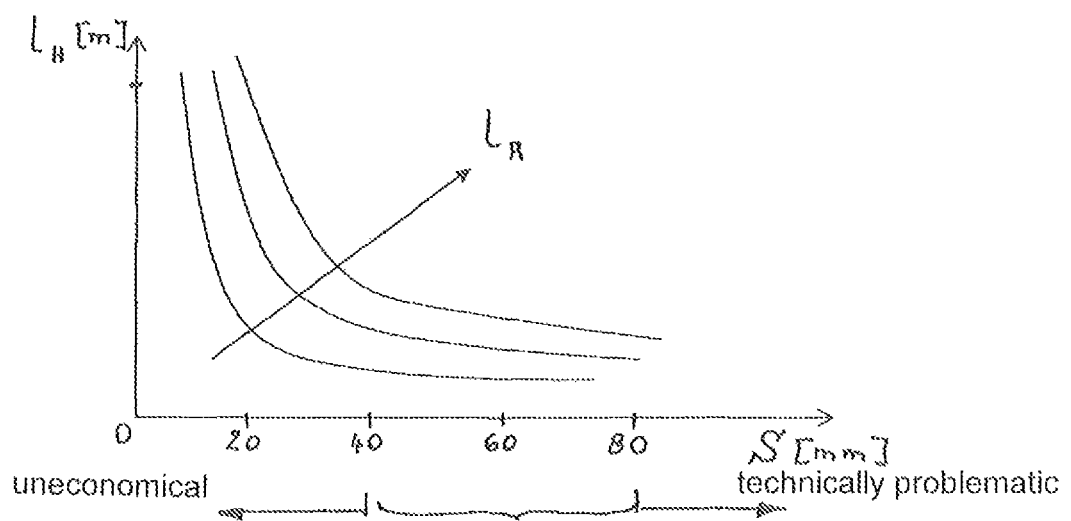
FIG. 9 shows a diagram representing an optimal pitch, where the heat conductor length is plotted in relation to the pitch and the pipe length.

As revealed in the diagram in FIG. 9, the pitch S indicated in mm in the diagram may be varied in dependence of the heating element length $l_H$ indicated in meters in the diagram in FIG. 9 and in dependence of the length $l_R$ of the medium pipe, wherein the length of the medium pipe increases in direction of the arrow. A pitch on the medium pipe in the range between 20 and 150 mm is economically and technically possible, wherein a pitch in the range between 40 and 80 mm has proven to be most favourable. This applies both for a heating element with one wire or wire strand and for a heating element with two identical wires or wire strands run in parallel, wherein the cold conductors or electrical connectors or feeders arranged at the ends of the heating element may be from zero to four conductors.

Apart from the embodiment variants of heatable medium pipes described above and shown in the figures numerous further embodiments are feasible in which, respectively, the wires or wire strands of the heating element extend without any joints in the transition area between medium pipe and pipe connector and continuously along the pipe connector and the medium pipe on the respective outside. During production of such a heatable medium pipe the heating element is initially enwrapped continuously around the medium pipe, the heating element is pre-assembled, having been fastened or fixed on the medium pipe by at least one fastening element, the medium pipe is cut to a length specific to the application and corresponding to the desired medium pipe length plus the heating element length required for enwrapping the at least one pipe connector and the transition area, the fastening element is removed in the area outside the desired medium pipe length, the heating element is unwrapped from the desired medium pipe length, the medium pipe is connected with the at least one pipe connector and the heating element is wrapped around the at least one pipe connector.

LIST OF REFERENCE SYMBOLS 1 heatable medium pipe
2 heating element
4 cold conductor or electrical connector
10 tubular medium pipe
11 first pipe connector
12 medium pipe end
13 medium pipe end
14 central medium pipe section
15 corrugated pipe
16 fastening element or adhesive tape, textile adhesive tape, textile tape
17 second pipe connector
18 transition area
19 transition area
20 first wire or wire strand
21 second wire or wire strand
23 wire or wire strand end
24 wire or wire strand end
25 wire or wire strand end
26 wire or wire strand end
27 crimping point
28 form element
29 protective cap
30 protective cap
31 connecting branch
32 aperture
33 aperture
34 joint
35 strap element
40 plug connector
41 plug connector
42 joint
13 corrugated pipe
100 medium pipe
112 medium pipe end
113 medium pipe end
114 central medium pipe section
150 air gap
170 rib structure 211 pipe connector
212 form element
213 form element
214 form element
215 form element
216 winding groove
217 rib
$R_L$ resistance of heating element
S pitch
$S_1$ pitch of wire or wire strand 20
$S_2$ pitch of wire or wire strand 21
$l_H$ heating element length
$l_R$ medium pipe length
$L_{R+H}$ Elongated medium pipe length
$l_0$ surplus length
s wall thickness of medium pipe
$d_i$ inner diameter of 10
$d_l$ diameter of wire or wire strand
s wall thickness
$L_S$ size of air gap

What is claimed is:

1. A heatable medium pipe comprising: at least one pipe connector and a heating element, wherein the heating element comprises a few wires or wire strands,
wherein said wires or wire strands extend continuously both along the medium pipe and along the at least one pipe connector, wherein the medium pipe is a pre-assembled medium pipe equipped with a few wires or wire strands, wherein the wires or wire strands are fastened on the medium pipe with at least one fastening element, wherein heating of the medium pipe and the at least one pipe connector is effected via the few wires or wire strands which are provided on the pre-assembled medium pipe.

2. The heatable medium pipe according to claim 1, wherein the wires or wire strands extend, without any joints, in a transition area between the medium pipe and the pipe connector and continuously along the pipe connector and the medium pipe on their respective outsides.

3. The heatable medium pipe according to claim 1, wherein the wires or wire strands are wound around the pipe connector in a spiral-shaped and/or meandering pattern or are arranged about the pipe connector in a strung-out fashion.

4. The heatable medium pipe according to claim 1, wherein the heating element is fitted adaptively to the medium pipe and/or the pipe connector, in particular in that the wires or wire strands, at least one fastening element for fastening the wires or wire strands on the medium pipe and/or an insulation and/or protection device for the insulation and/or for the protection of the medium pipe and/or the pipe connector and/or the transition area between medium pipe and pipe connector are adaptively fitted.

5. The heatable medium pipe according to claim 1, wherein the wires or wire strands are connected to form one continuous part, and two identical wires or wire strands are provided.

6. The heatable medium pipe according to claim 1, wherein the wires or wire strands are unconnected or indirectly connected, in particular via a further pipe.

7. A pre-assembled medium pipe for a heatable medium pipe claim 1, wherein the medium pipe has at least one heating element wrapped around it on the outside,
wherein a pitch of the wrapping varies in sections, wherein the heating element is wrapped section-wise around the medium pipe at a lesser pitch than in the remaining wrapping area.

8. A method for producing a heatable medium pipe, comprising the medium pipe, at least one pipe connector, a transition area between medium pipe and pipe connector and at least one heating element, wherein the heating element comprises a few wires, comprising the steps of:
obtaining a heating element that is continuously wound around a tubular medium pipe and is pre-assembled, having been fastened or fixed to the medium pipe by at least one fastening element, in that the medium pipe is cut to a first length for the particular application, said length corresponding to a desired medium pipe length ($l_R$) plus a heating element length ($l_H$) required for wrapping around the at least one pipe connector and the transition area, the fastening element is removed in a region outside the desired medium pipe length ($l_R$), the heating element is unwrapped from the medium pipe section cut off the first length, the medium pipe is cut to the desired medium pipe length ($l_R$) to form a second medium pipe section, the medium pipe section is connected to the at least one pipe connector as the medium pipe, and the heating element is wrapped around at least the at least one pipe connector.

9. The method according to claim 8, wherein prior to connecting the medium pipe section with the at least one pipe connector, at least one device is arranged for the protection and/or insulation of the medium pipe around the medium pipe.

10. The method according to claim 8, wherein open ends of the heating element are connected directly or indirectly with a feed connector for connecting to a current or voltage source.

11. The method according to claim 8, wherein open ends of the heating element are connected with each other, in particular in the area of the pipe connector.

12. The method according to claim 8, wherein at least one device for the protection and/or insulation of the pipe connector and/or of the transition area between medium pipe and pipe connector is arranged around the medium pipe.

13. The method according to claim 8, wherein the heating element is wrapped around the pre-assembled tubular medium pipe along its longitudinal extension at a pitch varying in sections.

14. The method according to claim 8, wherein the heating element, during pre-assembly of the medium pipe, is adaptively wrapped onto the same and/or in that the heating element is adaptively fitted on the medium pipe and/or the pipe connector.

15. The heatable medium pipe according to claim 1, wherein the heating element comprises two wires or wire strands.

16. The method according to claim 9, wherein a corrugated pipe is pushed axially onto the medium pipe.

17. The heatable medium pipe according to claim 2, wherein the wires or wire strands are wound around the pipe connector in a spiral-shaped and/or meandering pattern or are arranged about the pipe connector in a strung-out fashion, and
wherein the heating element is fitted adaptively to the medium pipe and/or the pipe connector, in particular in that the wires or wire strands, at least one fastening element for fastening the wires or wire strands on the medium pipe and/or an insulation and/or protection device for the insulation and/or for the protection of the medium pipe and/or the pipe connector and/or the transition area between medium pipe and pipe connector are adaptively fitted.

18. The heatable medium pipe according to claim 17, wherein the wires or wire strands are connected to form one continuous part, and two identical wires or wire strands are provided.

19. The method according to claim 9, wherein open ends of the heating element are connected directly or indirectly with a feed connector for connecting to a current or voltage source, and wherein open ends of the heating element are connected with each other, in particular in the area of the pipe connector.

20. The method according to claim 19, wherein protective caps for enveloping the at least one pipe connector and the at least one transition area to the medium pipe are arranged so as to surround the same and/or the protection and insulation device surrounding it, wherein the heating element is wrapped around the pre-assembled tubular medium pipe along its longitudinal extension at a pitch varying in sections, and wherein the heating element, during pre-assembly of the medium pipe, is adaptively wrapped onto the medium pipe and/or in that the heating element is adaptively fitted on the medium pipe and/or the pipe connector.

* * * * *